No. 698,477. Patented Apr. 29, 1902.
I. I. EDGERLY.
CLOTHES LINE REEL.
(Application filed Mar. 28, 1901.)
(No Model.)
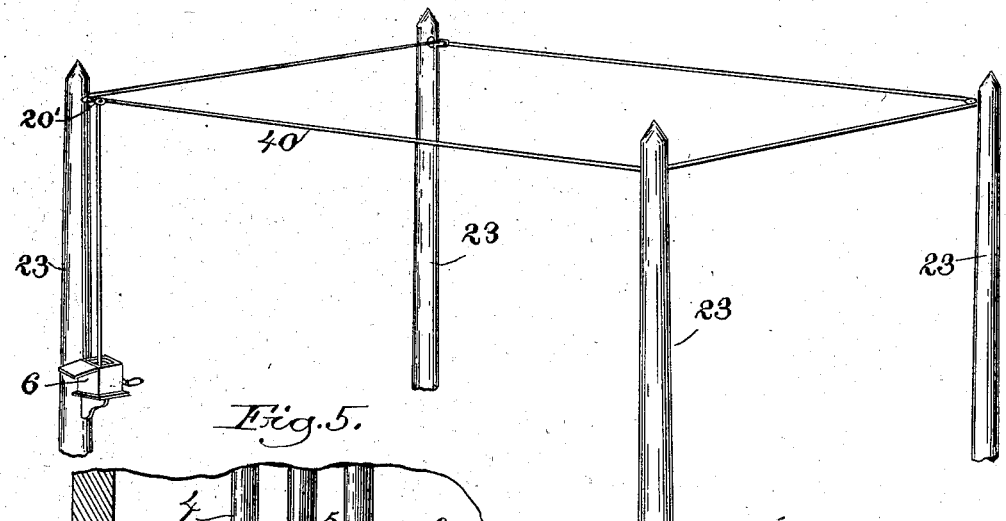
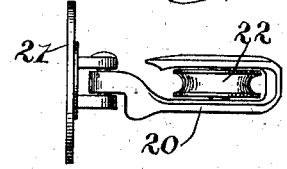
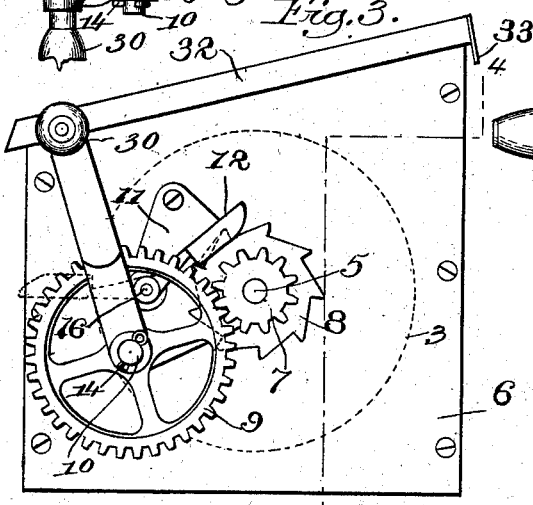
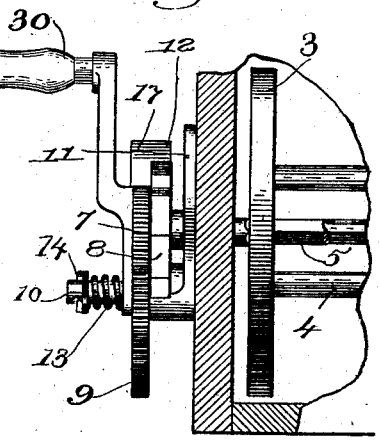
Witnesses:
Adolph H. Kaiser
Fred S. Greenleaf
Inventor:
Isaiah I. Edgerly,
By Crosby Gregory
Attys

UNITED STATES PATENT OFFICE.

ISAIAH IRVING EDGERLY, OF SWAMPSCOTT, MASSACHUSETTS.

CLOTHES-LINE REEL.

SPECIFICATION forming part of Letters Patent No. 698,477, dated April 29, 1902.

Application filed March 28, 1901. Serial No. 53,274. (No model.)

*To all whom it may concern:*

Be it known that I, ISAIAH IRVING EDGERLY, a citizen of the United States, residing at Swampscott, in the county of Essex and State of Massachusetts, have invented an Improvement in Clothes-Line Reels, of which the following description, in connection with the accompanying drawings, is a specification, like numerals on the drawings representing like parts.

It is the object of my invention to provide a novel clothes-line reel and support which will greatly facilitate the putting up and taking down of a clothes-line and which when the clothes-line is reeled will thoroughly protect the same. To accomplish this, I use a series of open hooks, which are attached to the various posts or supports for the clothes-line, and a reel which is inclosed in a housing or box. The reel is mounted upon a shaft which extends through the side of the box, and on the projecting end of said shaft is rigidly mounted a pinion, which normally meshes with a slidably-mounted drive-gear. A suitable pawl and ratchet operates to prevent the unwinding of the line from the reel, and the said pawl is so constructed that when thrown back out of engagement with the ratchet it will operate to hold the drive-gear out of mesh with the pinion on the shaft, so that the clothes-line may be freely unwound from the reel.

In using my device the clothes-line is looped through the open hooks on the various posts or supports and then the drive-gear operated to wind the line up and draw the same taut, the pawl and ratchet operating to maintain it in this condition.

Referring to the drawings, Figure 1 is a perspective view of my clothes-line in its operative position. Fig. 2 is a detail view of one of the open hooks. Fig. 3 is a side elevation of the box inclosing the reel and showing the operating mechanism for the reel. Fig. 4 is a section on the line 4 4, Fig. 3; and Fig. 5 is a plan view of the operating-gears, the box being shown in section.

The reel, which may be of any suitable character, is shown as comprising the end flanges 3, which are connected by rods 4, the said reel being mounted upon a shaft 5 and being inclosed in a box or housing 6, which is adapted to be permanently secured to any suitable fixed support, such as a clothes-line pole 23 or the side of a house, the said shaft being journaled at its ends in the sides of the box in any suitable way. One end of the shaft projects through the side of the box, and on its projecting end is rigidly secured a pinion 7, having integral therewith a ratchet-wheel 8.

A suitable drive-gear 9, which is preferably of larger diameter than the pinion 7 and which is normally in mesh with said pinion, is slidably mounted upon an offset or shaft 10, supported on the outside of the box, the said offset being shown as part of a casting 11, which casting also carries the pivotally-mounted pawl 12 and has an aperture through which the end of the shaft 5 of the reel projects. A coiled spring 13, surrounding the offset 10 and bearing at one end against the hub of the drive-gear 9 and at the other end against a pin 14, serves to normally hold the said drive-gear in its operative position in mesh with the pinion 7. A suitable crank or handle 30 is rigidly connected to the drive-gear for rotating the same when it is desired to wind up the clothes-line.

The pawl 12, before referred to, and which coöperates with the ratchet-wheel 8, is pivotally mounted, as at 16, on the casting 11, and the said pawl has at its end the offset projection 17, which when the pawl is thrown back into the dotted-line position, Fig. 3, engages the inner face of the drive-gear 9 and holds the same out of mesh with the pinion 7, as seen in Fig. 5, this being the position of the parts when it is desired to rapidly and freely unwind the clothes-line from the reel.

In connection with my reel I use a series of open hooks 20, (see Fig. 2,) the said open hooks being pivotally mounted to a suitable holder 21 and preferably having journaled therein the rollers 22. These hooks will be properly placed upon the various posts 23 or other supports for the clothes-line.

In putting up the clothes-line for use the operator will slide the drive-gear longitudinally on the offset 10 to disengage the same from the pinion 7 and swing the pawl 12 into the dotted-line position, Fig. 3, the offset lug 17 on said pawl operating to maintain the drive-gear in such position against the action of the spring 13, as seen in Fig. 5. The clothes-line may now be rapidly and freely withdrawn from the reel, and it will be placed in the various open hooks 20 on the various supports 23, the end of the clothes-line of course being fastened to one of said hooks. The pawl 12 will now be swung into the full-line position, Fig. 3, to coöperate with the ratchet-wheel 8, when the spring 13 will automatically slide the drive-gear 9 longitudinally of the shaft 10 and throw said drive-gear into mesh with the pinion 7. The operator will then turn the drive-gear by means of the crank 30 and wind up the clothes-line sufficiently to draw it taut, when it is ready for use. When it is desired to take in the clothes-line, it will be disengaged from the various hooks 20, when by the manipulation of the drive-gear 9 it may be rapidly wound upon the reel, the size of the drive-gear relative to the pinion 7 enabling this to be speedily done.

In order to bring the box or housing 6 in which the clothes-line reel is supported within convenient reach of the operator, I will preferably support the same upon the post or house, as illustrated in Fig. 1—i.e., the box will be placed below the level of the hook 20 on said post and within convenient reach of the operator, and one hook 20' will be placed directly above the box or housing and with its pulley rotating about a horizontal axis, and the clothes-line 40 will be led from the reel in the box or housing up over the hook 20' and thence taken to the other hooks 20. It should be remarked that the hooks on the remaining posts will be so positioned that the rollers 22 will rotate about a vertical axis, this position of the hooks being preferable, since the clothes-line is less liable to become disengaged therefrom.

It is the intention of my invention to provide such a housing for the clothes-line reel that the said reel may be left in the housing in all kinds of weather and yet the clothes-line be kept perfectly dry, and for this purpose the box or housing has the cover 32 hinged thereto in any suitable way, as by ordinary hinges, (not shown,) preferably on the opposite side thereof from the handle 30, the said cover projecting slightly beyond the edge of the box.

Where the box is secured to the side of a house or other flat support, so that it is impossible to project the side of the cover adjacent the house sufficiently beyond the side of the box 6 to prevent rain from leaking into the box, I will provide that side of the cover adjacent the house with the flap 33, of any suitable material, such as rubber or leather, which flap overlaps the side of the box when the cover is shut, as seen in Fig. 3, thereby making the box water-tight.

By placing the drive-gear in front of the pinion 7, as seen in Fig. 3, the drive-gear is so positioned that when the box or housing 6 is secured to the side of a house or other flat surface the rotation of the handle 30 is not interfered with in any way, as it would be if the said handle were placed directly upon the end of the shaft 5.

Various changes may be made in the structure of the device without departing from the spirit of my invention.

Having described my invention, what I claim, and desire to secure by Letters Patent, is—

1. In a clothes-line reel, a box or housing, a reel mounted on a shaft and inclosed therein, a pinion on the outside of the box and connected to said reel to rotate the same, a slidably-mounted drive-gear normally in mesh with the pinion, a spring to maintain said gear in its operative position, and a pawl coöperating with the ratchet, said pawl having a lug thereon which is adapted to engage the drive-gear and hold the same out of mesh with the pinion when the pawl is in inoperative position.

2. In a clothes-line reel, a box or housing, a reel mounted on a shaft and inclosed therein, the end of the shaft projecting through the box or housing, a pinion fast on the projecting end of the shaft, a ratchet integral therewith, a slidably-mounted drive-gear normally in mesh with the pinion, a pawl coöperating with the ratchet, said pawl having a lug thereon which when the pawl is in inoperative position with respect to the ratchet is adapted to engage the inner face of the drive-gear and hold the same out of mesh with the pinion, and means for automatically throwing the drive-gear into mesh with the pinion when the pawl is thrown into operative position.

3. In an apparatus of the class described, a series of open hooks adapted to support a clothes-line, combined with a clothes-line reel inclosed in a box or housing, a pinion on the outside of the box connected to the reel, a shaft projecting from the side of the box, a drive-gear slidably mounted thereon and normally in mesh with the pinion but adapted to be disconnected therefrom whereby the drive-gear may be thrown out of engagement with the pinion when it is desired to unwind the reel and means to hold said drive-gear in either of its adjusted positions.

4. In apparatus of the class described, a box or housing adapted to be secured to a support and having a hinged cover, a reel inclosed in said box, a pinion on the outside of the box and connected to the reel, a shaft projecting from the outside of the box, a driving-gear slidably mounted upon said shaft and adapted to be made to mesh with or be disconnected from the pinion, means to hold the driving-gear in either of its adjusted positions, combined with a series of open hooks adapted to support a clothes-line, one of said hooks being connected to the support above the box whereby the clothes-line when in place extends through the open upper end of the box up to said last-named open hook and then to another hook of the series.

5. In a clothes-line reel, a box inclosing a reel, a casting on the outside of the box, said casting having an aperture to receive and form a bearing for the end of the shaft of the reel, a combined pinion and ratchet fast on said shaft, a stud integral with the casting, a drive-gear on said stud and meshing with the pinion, a pawl pivoted to the casting and coöperating with the ratchet, and means whereby the drive-gear may be disconnected from or may be made to mesh with the pinion.

In testimony whereof I have signed my name to this specification in the presence of two subscribing witnesses.

ISAIAH IRVING EDGERLY.

Witnesses:
LOUIS C. SMITH,
JOHN C. EDWARDS.